United States Patent
Araya et al.

(10) Patent No.: US 9,494,778 B2
(45) Date of Patent: Nov. 15, 2016

(54) SCANNING LASER MICROSCOPE

(71) Applicant: OLYMPUS CORPORATION, Shibuya-ku, Tokyo (JP)

(72) Inventors: Akinori Araya, Kanagawa (JP); Yohei Kuwabara, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 130 days.

(21) Appl. No.: 14/217,028

(22) Filed: Mar. 17, 2014

(65) Prior Publication Data

US 2014/0285654 A1    Sep. 25, 2014

(30) Foreign Application Priority Data

Mar. 21, 2013  (JP) .................................. 2013-058720
Mar. 5, 2014   (JP) .................................. 2014-042940

(51) Int. Cl.
    *G02B 21/00*    (2006.01)
(52) U.S. Cl.
    CPC ......... *G02B 21/008* (2013.01); *G02B 21/0076* (2013.01)
(58) Field of Classification Search
    CPC ..................... G02B 21/008; G01N 21/6452
    See application file for complete search history.

(56) References Cited

U.S. PATENT DOCUMENTS

| 8,129,697 B2* | 3/2012 | Mano | G02B 21/0076 250/458.1 |
| 2010/0208339 A1* | 8/2010 | Kleppe | G02B 21/06 359/385 |

FOREIGN PATENT DOCUMENTS

| JP | 2004-069752 A | 3/2004 |
| JP | 2005-338465 A | 12/2005 |
| JP | 2005-352100 A | 12/2005 |

* cited by examiner

*Primary Examiner* — Joseph Ustaris
*Assistant Examiner* — Zhubing Ren
(74) *Attorney, Agent, or Firm* — Holtz, Holtz & Volek PC

(57) ABSTRACT

Brightness information with a wide dynamic range is acquired and observed while preventing degradation of a detector. The invention provides a microscope system including a scanner that two-dimensionally scans laser light emitted from a light source unit on a specimen; a detector (41) that detects light from the specimen on which the laser light is scanned by the scanner and outputs a light intensity signal corresponding to the light intensity of the detected light; a PC that converts the light intensity signal output from the detector (41) to brightness information at each pixel corresponding to the scanning position of the scanner and that generates an image of the specimen; a second integrating circuit (70) that calculates an integrated value corresponding to the total light intensity signal output from the detector (41) within a given time; a comparator (55) that determines whether or not that integrated value of a voltage signal exceeds a prescribed threshold; and a high-voltage control portion (87) that stops detection of light by the detector (41) when it is determined by the comparator (55) that the voltage signal exceeds the prescribed threshold.

7 Claims, 6 Drawing Sheets

SCANNING LASER MICROSCOPE

CROSS-REFERENCE TO RELATED APPLICATIONS

This application is based on Japanese Patent Application No. 2013-058720 and Japanese Patent Application No. 2014-042940, the contents of which are incorporated herein by reference.

TECHNICAL FIELD

The present invention relates to a scanning laser microscope.

BACKGROUND ART

In the related art, there is a need for detecting ultraweak fluorescence in biological systems research, particularly in research markets in which microscopes are used, and there are known scanning laser microscopes that are equipped with a photomultiplier tube (PMT) serving as a detector (for example, see Patent Literature 1). In addition, since a PMT suffers from the problem that it is degraded or damaged when irradiated with an excessively high level of light, one known approach involves stopping the operation of the PMT when a signal of a certain value or greater is output from the PMT for a prescribed duration due to strong incident light, by means of a protection circuit for preventing degradation or damage due to an excessively high level of light.

CITATION LIST

Patent Literature

{PTL 1}
Japanese Unexamined Patent Application, Publication No. 2005-352100

SUMMARY OF INVENTION

Technical Problem

However, with the scanning laser microscope in the related art, an instantaneous (for example, about 50 nsec) time is set as the "prescribed duration", and in practice when a signal of a certain value or greater is output from the PMT, the operation of the PMT is stopped immediately. Therefore, if the obtained signal contains brightness information with a wide dynamic range, the operation of the PMT ends up being stopped due to the brightness information in an area where the intensity is high.

The present invention has been conceived in light of the circumstances described above, and an object thereof is to provide a scanning laser microscope that enables acquisition and observation of brightness information with a wide dynamic range, while preventing degradation of a detector.

Solution to Problem

A first aspect of the present invention is a scanning laser microscope including a scanning portion that two-dimensionally scans laser light emitted from a light source on a specimen; a light detecting portion that detects light from the specimen on which the laser light is scanned by the scanning portion and that outputs a light intensity signal that corresponds to the light intensity of the detected light; an image generating portion that converts the light intensity signal output from the light detecting portion to brightness information at each pixel corresponding to a scanning position of the scanning portion and that generates an image of the specimen; a calculating portion that calculates light intensity information corresponding to the total light intensity signal output from the light detecting portion within a given time; a threshold decision portion that determines whether or not the light intensity information calculated by the calculating portion exceeds a prescribed threshold; and a control portion that stops detection of light by the light detecting portion when it is determined by the threshold decision portion that the light intensity information exceeds the prescribed threshold.

With this aspect, when the laser light is emitted from the light source, that laser light is two-dimensionally scanned on the specimen by the scanning portion; the light from the specimen is detected by the light detecting portion, and a light intensity signal is output; and the light intensity signal is converted to brightness information by the image generating portion, and an image of the specimen is generated. Accordingly, the scanning range of the specimen can be observed in the image.

In this case, with a light detecting portion like a photomultiplier tube, when the total amount of light incident thereon in a given time exceeds a certain level, degradation tends to advance. In this aspect, by calculating, with the calculating portion, the light intensity information corresponding to the total light intensity signal output from the light detecting portion in a given time and by stopping the detection of light by the light detecting portion by using the control portion when it is determined by the threshold decision portion that the calculated light intensity information exceeds the prescribed threshold, it is possible to prevent light having a level equal to or greater than the threshold from being incident on the light detecting portion. For example, if an upper limit of the total amount of light at which degradation of the light detecting portion advances is set as the prescribed threshold, when an excessively high level of light continues to be incident on the light detecting portion, it is possible to prevent the degradation of the light detecting portion from advancing.

In addition, by using the light intensity information corresponding to the total light intensity signal output in a given time, it is possible to control the detection of light by the light detecting portion without the intensity having an effect on a strong part of the light intensity signal, and thus an image can be acquired. For example, even when an intense light intensity signal is momentarily output due to fluorescence of a minute amount of fluorescent agent attached to the surface of the specimen, detection of light by the light detection portion is not stopped.

Therefore, it is possible to acquire and observe brightness information in a wide dynamic range while preventing degradation of the light detecting portion.

In the above-described aspect, the image generating portion may generate the image by accumulating the brightness information converted at each pixel at a prescribed pixel clock; and the calculating portion may set, as the light intensity information, an integrated value obtained by integrating, with a period longer than the pixel clock of the image generating portion, the light intensity signal output from the light detecting portion within a given time.

With this configuration, it is possible to correctly calculate the total light intensity signal output from the light detecting portion in a given time. Accordingly, it is possible to set an appropriate threshold for preventing degradation of the light detecting portion from advancing.

In the above-described aspect, the calculating portion may perform integration processing during a scanning period in which the laser light is scanned on the specimen by the scanning portion and a flyback period in which emission of laser light from the light source is stopped and a scanning line of the laser light is returned to an original position.

With this configuration, it is possible to set an appropriate threshold for preventing degradation of the light detecting portion from advancing.

In the above-described aspect, the image generating portion may generate the image using first brightness information obtained by accumulating the light intensity signal at each pixel at a prescribed pixel clock; and the calculating portion may set, as the light intensity information, second brightness information obtained by adding-up the first brightness information for a plurality of pixel clocks.

With this configuration, it is possible to calculate the light intensity information with the calculating portion by using the brightness information with which the image is generated by the image generating portion. Therefore, it is possible to simplify the configuration, using just a single circuit for accumulating the light intensity signal.

In the above-described aspect, the image generating portion includes an A/D converting portion that converts the first brightness information to a digital signal at a sampling period that is an integer fraction of a prescribed pixel clock; the calculating portion may include a management portion that compares the first brightness information converted by the A/D converting portion at the sampling period with an upper limit at which A/D conversion is possible by the A/D converting portion and that sets brightness information to be added-up, a storage unit that stores the first brightness information and a sampling time thereof in association with each other, when it is determined by the management portion that the first brightness information is smaller than the upper limit, and an addition portion that adds-up the brightness information to be added-up, which is set by the management portion, at a period that is longer than the pixel clock; and when the first brightness information is smaller than the upper limit as a result of comparison at the individual pixel clocks, the management portion may set that first brightness information as the brightness information to be added-up, and when the first brightness information is equal to the upper limit, the management portion may set an estimated value based on the first brightness information and the sampling time thereof, which are stored in the storage unit, as the brightness information to be added-up.

When an excessively high level of light that exceeds the upper limit at which A/D conversion by the A/D converting portion is possible is incident on the light detecting portion, the output from the A/D converting portion is saturated, and a correct digital signal cannot be obtained for the first brightness information. With the above-described configuration, when the first brightness information A/D converted by the A/D converting portion at the first pixel clock is equal to the upper limit of the A/D converting portion, the management portion defines the brightness information to be added-up on the basis of the first brightness information and the sampling time thereof, which are stored in the storage unit, thereby enabling the light intensity information to be precisely calculated by the addition portion. Therefore, even if an excessively high level of light that exceeds the upper limit of the A/D converting portion is incident on the light detecting portion, it is possible to reliably protect the light detecting portion.

In the above-described aspect, the image generating portion may generate the image by adding-up the brightness information converted at each pixel at a prescribed pixel clock; and the calculating portion may set, as the light intensity information, an addition value obtained by adding-up the light intensity signal output from the light detecting portion in a given time at a period longer than the pixel clock of the image generating portion.

With this configuration, it is possible to accurately calculate the total light intensity signal output from the light detecting portion in a given time.

In the above-described aspect, the control portion may turn ON/OFF a control voltage applied to the light detecting portion.

With this configuration, it is possible to prevent light from being incident on the light detecting portion simply by turning OFF, with the control portion, the control voltage applied to the light detecting portion.

In the above-described aspect, the control portion may insert and remove a blocking member that can block light that would usually be incident on the light detecting portion.

With this configuration, when the control voltage applied to the light detecting portion is not turned OFF, but remains ON, it is possible to prevent light from being incident on the light detecting portion.

Advantageous Effects of Invention

The present invention affords an advantage in that it is possible to acquire and observe brightness information with a wide dynamic range while preventing degradation of the detector.

DESCRIPTION OF EMBODIMENTS

First Embodiment

A microscope system (scanning laser microscope) according to a first embodiment of the present invention will be described below with reference to the drawings.

Figure 1:
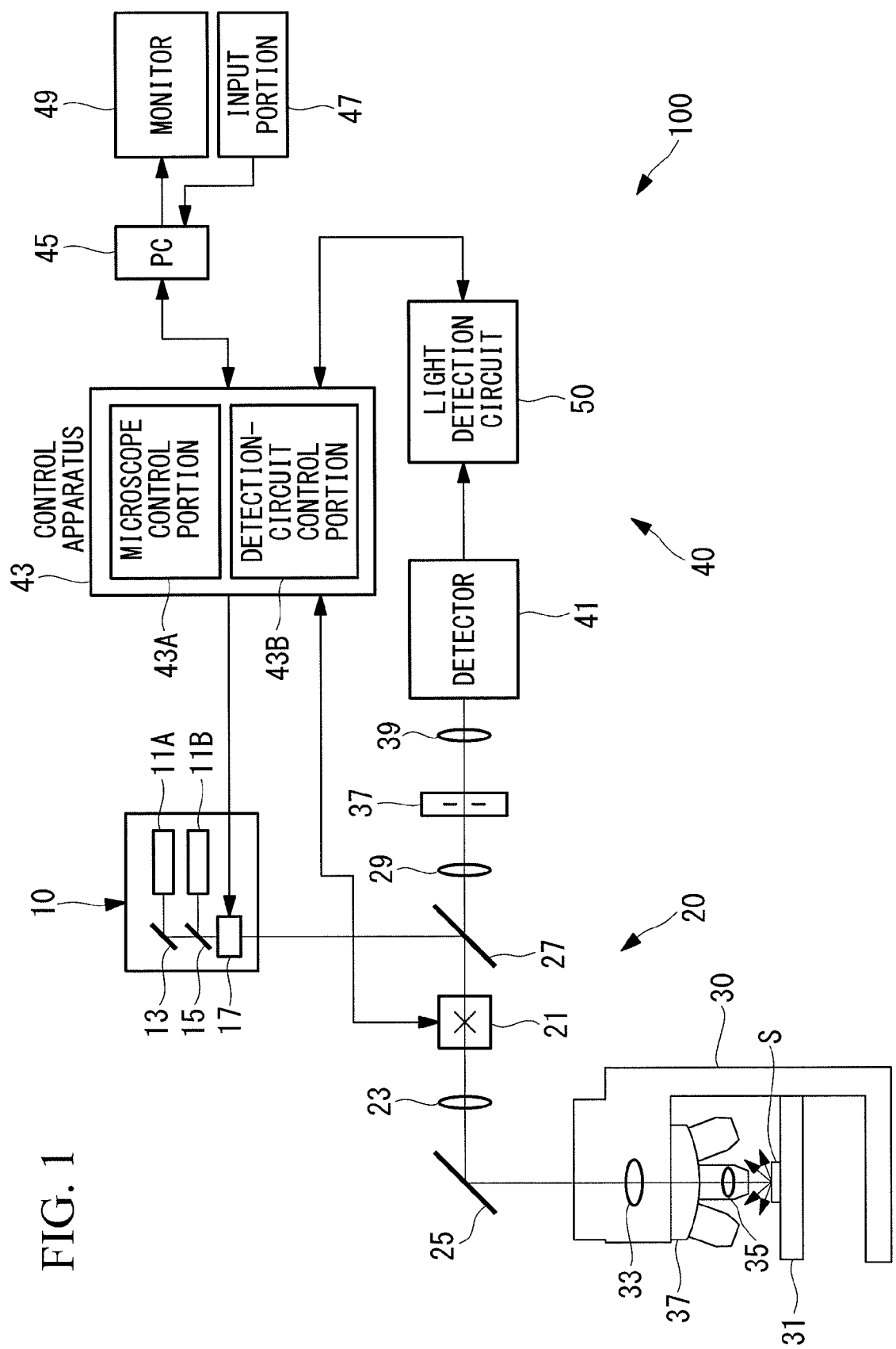
FIG. 1 is a diagram showing, in outline, the configuration of a microscope system according to a first embodiment of the present invention.

As shown in FIG. 1, a microscope system 100 according to this embodiment includes a light source unit (light source) 10 that emits laser light, a microscope apparatus 20 that irradiates a specimen S with the laser light emitted from the light source unit 10, a light detection system 40 that detects fluorescence generated in the specimen S irradiated with the laser light by the microscope apparatus 20, and a monitor 49 that displays an image of the specimen S in which the fluorescence is detected by the light detection system 40.

For example, multi-wavelength laser light sources are used as the light source unit 10. The light source unit 10 includes light source portions 11A and 11B, such as super-continuum lasers, which emit laser light; a reflecting mirror 13 that reflects the laser light emitted from the light source portion 11A; a dichroic mirror (DM) 15 that transmits the laser light reflected by the reflecting mirror 13 and that reflects the laser light emitted from the light source portion 11B to combine the light paths of these individual laser light beams; and a light-modulating portion 17, such as an acousto-optic element, that modulates the laser light beams whose light paths have been combined by the dichroic mirror 15.

This light source unit 10 can be made to emit laser light of a prescribed intensity in a prescribed wavelength region by emitting laser light from the laser light source portions 11A and 11B and controlling wavelength selection and power adjustment of the individual laser light beams with the light-modulating portion 17.

The microscope apparatus 20 includes a microscope main unit 30 having a stage 31 on which the specimen S is mounted; a scanner (scanning portion) 21 that reflects the laser light emitted from the light source unit 10 and scans the laser light on the specimen S; a pupil projection lens (PL) 23 that focuses the laser light reflected by the scanner 21; and a reflecting mirror 25 that reflects the laser light focused by the pupil projection lens 23 towards the microscope main unit 30.

As the scanner 21, it is possible to use, for example, a galvanometer mirror, a resonant scanner, or an AOD (Acousto-Optic Deflector, acousto-optical deflecting element).

The microscope main unit 30 includes, in addition to the stage 31, an imaging lens (TL) 33 that converts the laser light made incident by the reflecting mirror 25 to a collimated beam; a plurality of objective lenses 35 that irradiate the specimen S with the laser light converted to a collimated beam by the imaging lens 33 and that collect fluorescence generated in the specimen S; and a revolver 37 that holds the plurality of objective lenses 35 and that can selectively place the objective lenses 35 in the light path of the laser light.

In addition, the microscope apparatus 20 includes a dichroic mirror (DM) 27 that reflects the laser light from the light source unit 10 and makes it incident on the scanner 21, and that transmits fluorescence collected by the objective lens 35 and returning in the opposite direction along the light path of the laser light so as to split off the fluorescence from the light path of the laser light; a focusing lens (CFL) 29 that focuses the fluorescence transmitted through the dichroic mirror 27; a pinhole (PH) 37 that allows a portion of the fluorescence focused by the focusing lens 29 to pass therethrough; and a collimator lens 39 that converts the fluorescence that has passed through the pinhole 37 into a collimated beam and makes it incident on the light detection system 40.

The light detection system 40 includes a detector (light detecting portion) 41 that detects the fluorescence converted to a collimated beam by the collimator lens 39 and outputs a current signal (light intensity signal), a light detection circuit 50 that processes the current signal output from the detector 41, a control apparatus 43 that controls the light source unit 10, the scanner 21, the detector 41, the light detection circuit 50, and so forth, and a PC (Personal Computer, image generating portion) 45 that generates an image of the specimen S.

An input portion 47 with which the user inputs an instruction for operating the PC 45 and a monitor 49 that displays the image generated by the PC 45 are connected to this light detection system 40.

For example, a PMT (Photo Multiplier Tube) or HPD (Hybrid Photo Detector) can be used as the detector 41. This detector 41 is configured so as to photoelectrically convert the detected light and output a current signal of a magnitude corresponding to the light level.

Figure 2:
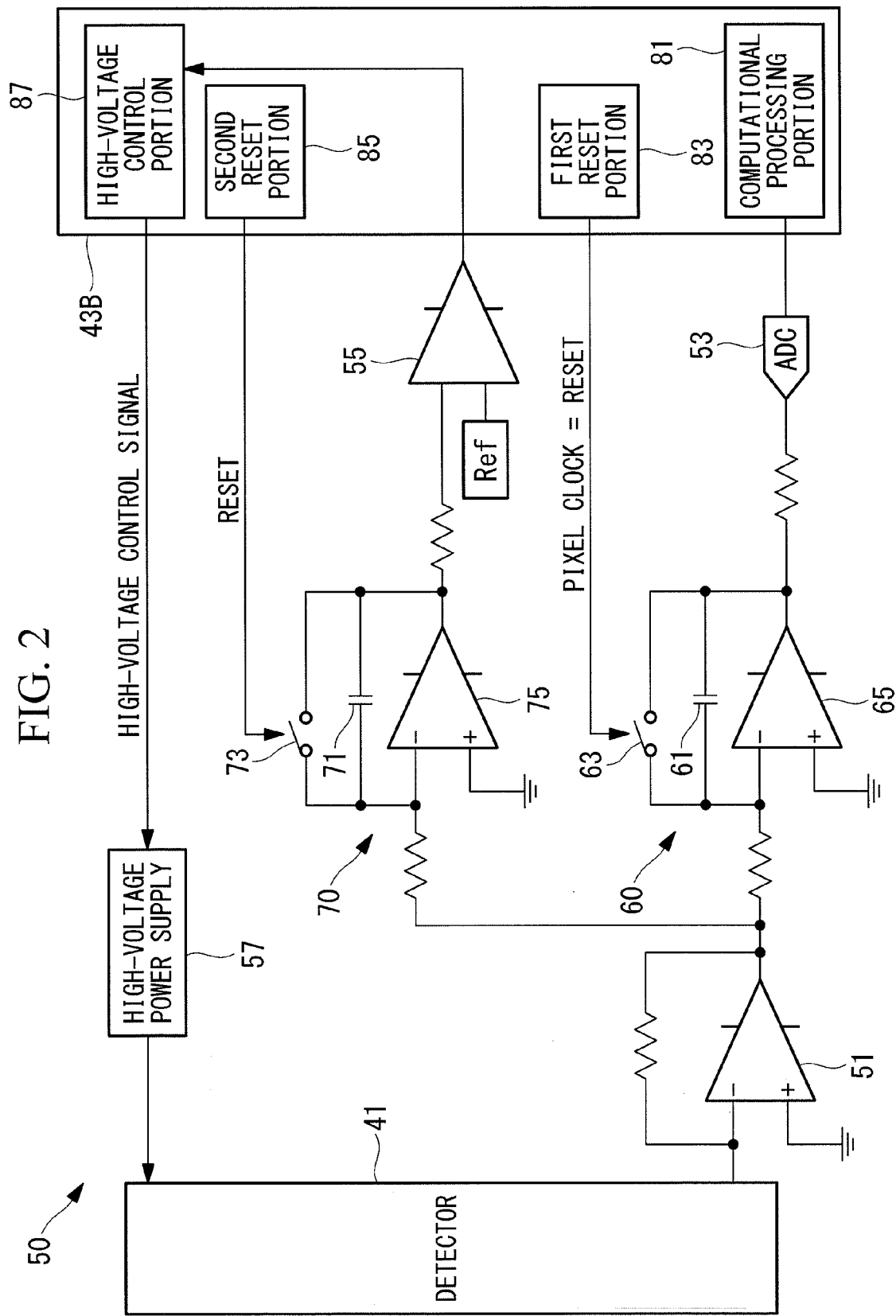
FIG. 2 is a block diagram showing details of a light detection circuit in FIG. 1.

As shown in FIG. 2, the light detection circuit 50 includes an amplifier 51 that converts the current signal sent from the detector 41 to a voltage signal, a first integrating circuit 60 that integrates the voltage signal converted by the amplifier 51 and outputs an integrated value, an AD converter (ADC) 53 that A/D converts the integrated value output from the first integrating circuit 60, a second integrating circuit (calculating portion) 70 that integrates the voltage signal converted by the amplifier 51 and outputs an integrated value (light intensity information), a comparator (threshold decision portion) 55 that compares the integrated value output from the second integrating circuit 70 with a prescribed threshold (Ref), and a high-voltage power supply 57 that applies an HV to the detector 41.

In the comparator 55, for example, an upper limit of the total amount of light at which degradation of the detector 41 advances is set as the prescribed threshold.

The integrating circuits 60 and 70 include capacitors 61 and 71 that can accumulate electrical charge corresponding to the voltage signal sent from the amplifier 51, switches 63 and 73 that switch between accumulation of electrical charge by the capacitors 61 and 71 and discharging of the accumulated electrical charge, and integrators (amplifying circuits) 65 and 75, such as op-amps or the like.

The switch 63 in the first integrating circuit 60 is configured so as to be turned ON/OFF (closed/open) by a prescribed control signal (hereinafter referred to as "first reset CLK").

The switch 73 in the second integrating circuit 70 is configured so as to be turned ON/OFF by a prescribed control signal that differs from the first reset CLK (hereinafter referred to as "second reset CLK").

With the switches 63 and 73 in the OFF state, electrical charges corresponding to the voltage signal sent from the amplifier 51 are accumulated in the capacitors 61 and 71, and integrated values corresponding to the electrical charges accumulated in the capacitors 61 and 71 are output. On the other hand, with the switches 63 and 73 in the ON state, the electrical charges accumulated in the capacitors 61 and 71 are discharged, and the integrated value outputs are reset.

By integrating the voltage signal according to the second reset CLK, the second integrating circuit 70 sends the integrated value of that voltage signal to the comparator 55 as light intensity information that corresponds to the total light intensity signal output from the detector 41 within a given time. The second integrating circuit 70 is configured so as to perform integration processing during a scanning period in which the laser light is scanned on the specimen S by the scanner 21 and a flyback period in which emission of laser light from the light source unit 10 is stopped, and in which the laser light scanning line returns to the original position.

The integrators 65 and 75 include inverting input terminals (−), non-inverting input terminals (+), and output terminals. The capacitors 61 and 71 and the switches 63 and 73 are connected in parallel to each other, between the inverting input terminals (−) and the output terminals of the integrators 65 and 75, respectively. The non-inverting input terminals (+) are connected to ground.

The control apparatus 43 includes a microscope control portion 43A that controls the microscope apparatus 30 and a detection-circuit control portion 43B that controls the light detection circuit.

The microscope control portion 43A performs ON/OFF control of the emission of laser light by the laser light source unit 10, swivel angle control of the scanner 21, and so on. The microscope control portion 43A, for example, turns OFF the emission of laser light by the laser light source unit 10 during the flyback period of the scanner 21.

The detection-circuit control portion 43B includes a computational processing portion (image generating portion) 81 that converts the voltage signal sent from the AD converter 53 into brightness information for each pixel corresponding to the scanning position of the scanner 21, a first reset portion 83 that outputs the first reset CLK which is sent to the first integrating circuit 60, a second reset portion 85 that outputs the second reset CLK which is sent to the second integrating circuit 70, and a high-voltage control portion 87 that performs ON/OFF switching for applying an HV to the detector 41 with the high-voltage power supply 57, based on the comparison result of the comparator 55.

The computational processing portion 81 is configured so as to send the converted brightness information to the PC 45.

The first reset portion 83 outputs the first reset CLK at a prescribed pixel clock so as to switch the switch 63 ON/OFF for each pixel.

The second reset portion 85 outputs the second reset CLK with a longer period than the pixel clock of the first reset CLK, for example, at intervals of 10 to 30 seconds, so as to switch the switch 73 ON/OFF at time intervals longer than the timing at which the switch 63 is switched ON/OFF.

The high-voltage control portion 87 outputs a high-voltage control signal on the basis of the comparison result in the comparator 55; when the integrated value output from the second integrating circuit 70 is less than or equal to a prescribed threshold, the high-voltage power supply 57 is kept switched ON, and when the integrated value output from the second integrating circuit 70 exceeds the prescribed threshold, the high-voltage power supply 57 is switched OFF.

The PC 45 generates an image of the specimen S by accumulating the brightness information sent from the computational processing portion 81 for each pixel. The image generated by the PC 45 is displayed on the monitor 49.

The operation of the thus-configured microscope system 100 will now be described.

To acquire an image of the specimen S with the microscope system 100 according to this embodiment, the specimen S is mounted on the stage 31, and the high-voltage power supply 57 is turned ON by the high-voltage control portion 87 to apply an HV to the detector 41, and laser light with a prescribed intensity and in a prescribed wavelength region is emitted from the light source unit 10.

The laser light emitted from the light source unit 10 is reflected by the dichroic mirror 27, after which the laser light is reflected by the scanner 21 and is focused by the pupil projection lens 23, passes via the reflecting mirror 25 and the imaging lens 33, and is radiated onto the specimen S by the objective lens 35.

When fluorescence is generated in the specimen S upon being irradiated with the laser light, the fluorescence is collected by the objective lens 35, returns along the light path of the laser light via the imaging lens 33, the reflecting mirror 25, the pupil projection lens 23, and the scanner 21, and is transmitted through the dichroic mirror 27, so as to split off from the light path of the laser light.

The fluorescence that has been transmitted through the dichroic mirror 27 is focused by the focusing lens 29, and only fluorescence generated at the focal position of the objective lens 35 in the specimen S passes through the pinhole 37. The fluorescence that has passed through the pinhole 37 is converted to a collimated beam by the collimator lens 39 and is detected by the detector 41.

When light is detected by the detector 41, a current signal having a magnitude that corresponds to the amount of light detected is output from the detector 41, and the current signal is converted to a voltage signal by the amplifier 51. The voltage signal converted by the amplifier 51 is sent to the first integrating circuit 60 and the second integrating circuit 70.

In the first integrating circuit 60, the switch 63 is turned ON/OFF for each pixel on the basis of the first reset CLK sent from the first reset portion 83. When the switch 63 is OFF, an electrical charge according to the voltage signal sent from the amplifier 51 is accumulated by the capacitor 61, and an integrated value according to the accumulated electrical charge is output. When the switch 63 is ON, the electrical charge accumulated in the capacitor 61 is discharged, and the integrated value output is reset.

The integrated value of the voltage signal output from the first integrating circuit 60 is A/D converted by the AD converter 53, is sent to the detection-circuit control portion 43B, is converted by the computational processing portion 81 to brightness information for each pixel corresponding to the scanning position of the scanner 21, and is sent to the PC 45. Then, an image of the specimen S is generated by the PC 45 by accumulating the brightness information at each pixel. The image generated by the PC 45 is displayed on the monitor 49.

In the second integrating circuit 70, the switch 73 is turned ON/OFF at time intervals longer than the ON/OFF switching timing of the switch 63, on the basis of the second reset CLK sent from the second reset portion 85. When the switch 73 is OFF, an electrical charge according to the voltage signal sent from the amplifier 51 is accumulated by the capacitor 71, and an integrated value according to the accumulated electrical charge is output. When the switch 73 is ON, the electrical charge accumulated in the capacitor 71 is discharged, and thus the integrated value output is reset.

The integrated value output from the second integrating circuit 70 is compared, by the comparator 55, with an upper limit value of the total amount of light at which degradation of the detector 41 advances, which is set as the prescribed threshold.

Figure 3:
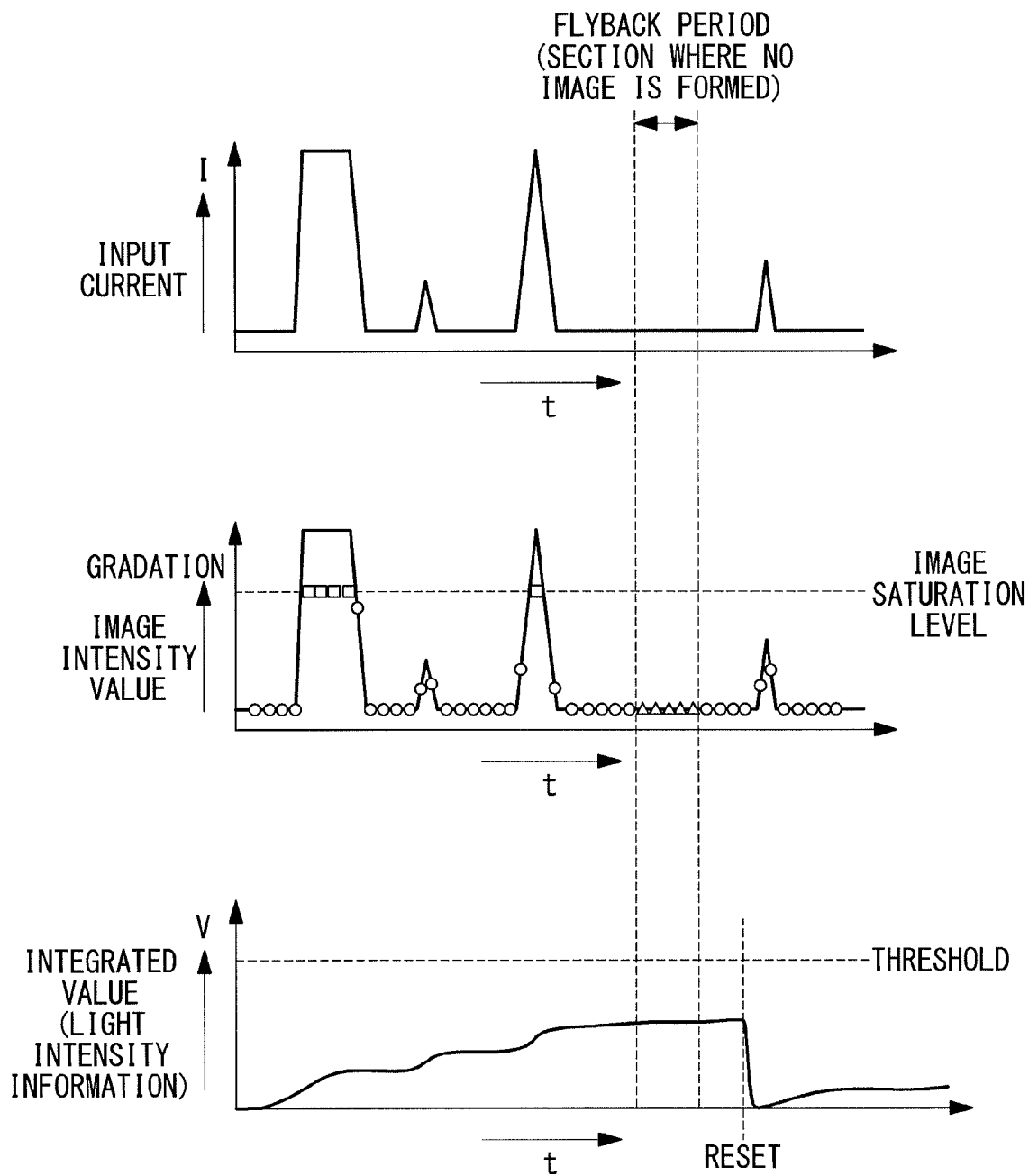
FIG. 3 shows graphs for explaining the relationship between the intensity of an input current to the light detection circuit and time, the relationship between the image intensity value of a voltage signal sent to the PC and time, and the relationship between an integrated value, corresponding to the total light intensity signal output from a detector in a given time, and time, for the microscope system in FIG. 1.

For example, as shown in FIG. 3, when the current signal output from the detector 41, in other words, the intensity of the input current input to the amplifier 51, increases, and the image intensity value at the integrated value of the voltage signal output from the AD converter 53 exceeds an image saturation level, the image generated by the PC 45 saturates. In the figure, the circles (○), squares (□), and triangles (Δ) indicate the image intensity values of respective pixels.

Even if the image intensity value for the current signal output from the detector 41 is high enough to exceed the image saturation level, so long as it exceeds the image saturation level momentarily, and so long as the integrated value output from the second integrating circuit 70 is less than or equal to the prescribed threshold, the high-voltage power supply 57 is kept ON by the high-voltage control portion 87, and the light continues to be detected by the detector 41.

Conversely, on the other hand, by continuously irradiating the detector 41 with an excessively high level of light until the integrated value output from the second integrating circuit 70 is reset at the cycle of the second reset CLK, when the integrated value output from the second integrating circuit 70 exceeds the prescribed threshold, the high-voltage power supply 57 is turned OFF by the high-voltage control portion 87, and light detection by the detector 41 is stopped.

As described above, with the microscope system 100 according to this embodiment, an integrated value corresponding to the total current signal output from the detector 41 within a given time is calculated by the second integrating circuit 70, and if the calculated integrated value exceeds a prescribed threshold, light detection by the detector 41 is stopped by the high-voltage control portion 87, thereby making it possible to prevent an increase in photoelectrons in the detector 41 due to a light level equal to or higher than the prescribed threshold, and to prevent damage to the detector 41.

Therefore, in a detector such as a photomultiplier tube, although there is a tendency for degradation to advance when the total amount of incident light within a given time exceeds a certain amount, by setting the upper limit of the total amount of light at which degradation of the detector 41 advances as the prescribed threshold, it is possible to continue to irradiate the detector 41 with an excessively high level of light within a given time, thus preventing the degradation of the detector 41 from advancing.

In addition, by using the integrated value corresponding to the total current signal output within a given time as the light intensity information, it is possible to control the light detection by the detector 41 without being influenced by a current signal whose intensity is high in one area, thus acquiring an image. For example, in observation in a case where one area in the microscope field of view is stained with a high concentration of a fluorescent agent, even if a current signal that becomes momentarily intense is output from the detector 41, detection of light by the detector 41 is not stopped.

In addition, in the second integrating circuit 70, by performing integration processing during the scanning period and the flyback period of the scanner 21, it is possible to set a correct threshold for preventing degradation of the detector 41 from advancing.

Therefore, with this embodiment, it is possible to acquire brightness information with a wide dynamic range so as to observe the specimen S, while preventing degradation of the detector 41.

This embodiment can be modified in the following ways.

Figure 4:
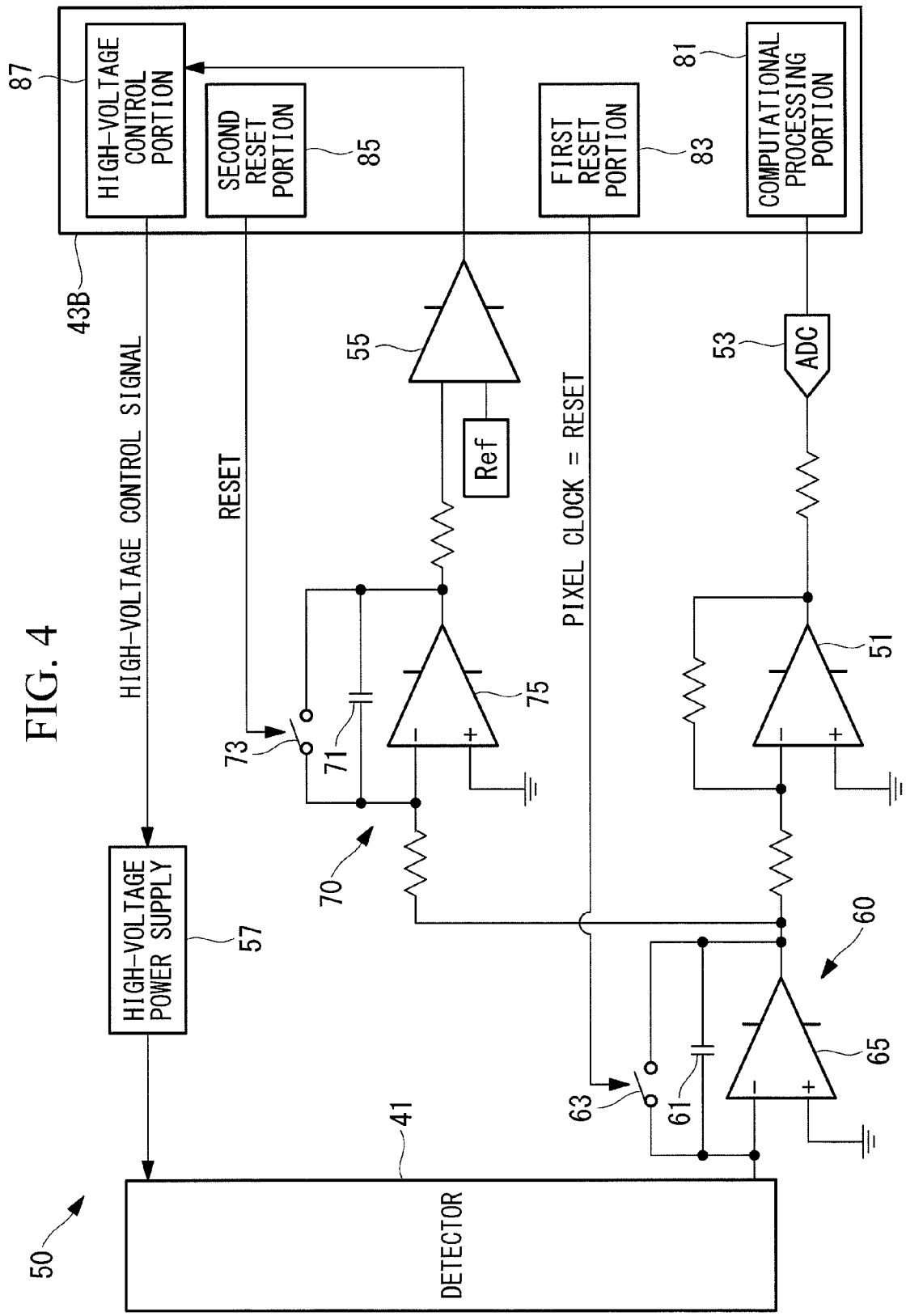
FIG. 4 is a block diagram showing details of a light detection circuit in a microscope system according to a first modification of the first embodiment of the present invention.

In this embodiment, it has been assumed that the voltage signal converted by the amplifier 51 is integrated individually by the first integrating circuit 60 and the second integrating circuit 70; instead of this, however, as shown in FIG. 4, the current signal output from the detector 41 may be integrated by the first integrating circuit 60 before being converted to a voltage signal.

Then, the integrated value integrated by the first integrating circuit 60 may be integrated by the second integrating circuit 70 and sent to the comparator 55, and may also be converted to a voltage signal by the amplifier 51 and sent to the AD converter 53.

By doing so, since the current signal immediately after being output from the detector 41 is integrated, it is possible to generate an image with a high S/N ratio.

In this embodiment, the state in which the image is acquired, that is to say, a situation in which the first reset CLK is operating, has been described; however, even in the state in which scanning is stopped, that is to say, a situation in which the first reset CLK is not operating, the second integrating circuit 70 continues to operate, and therefore, it is possible to realize a similar protection operation.

Second Embodiment

Next, a microscope system (scanning laser microscope) according to a second embodiment of the present invention will be described with reference to the drawings.

The microscope system 100 according to this embodiment differs from the first embodiment in that, as the light intensity information corresponding to the total light intensity signal output from the detector 41 in a given time, an addition value obtained by adding-up the voltage signal is used instead of the integrated value obtained by integrating the voltage signal.

In the following, parts having the same configuration as those in the microscope system 100 according to the first embodiment are assigned the same reference signs, and a description thereof will be omitted.

Figure 5:
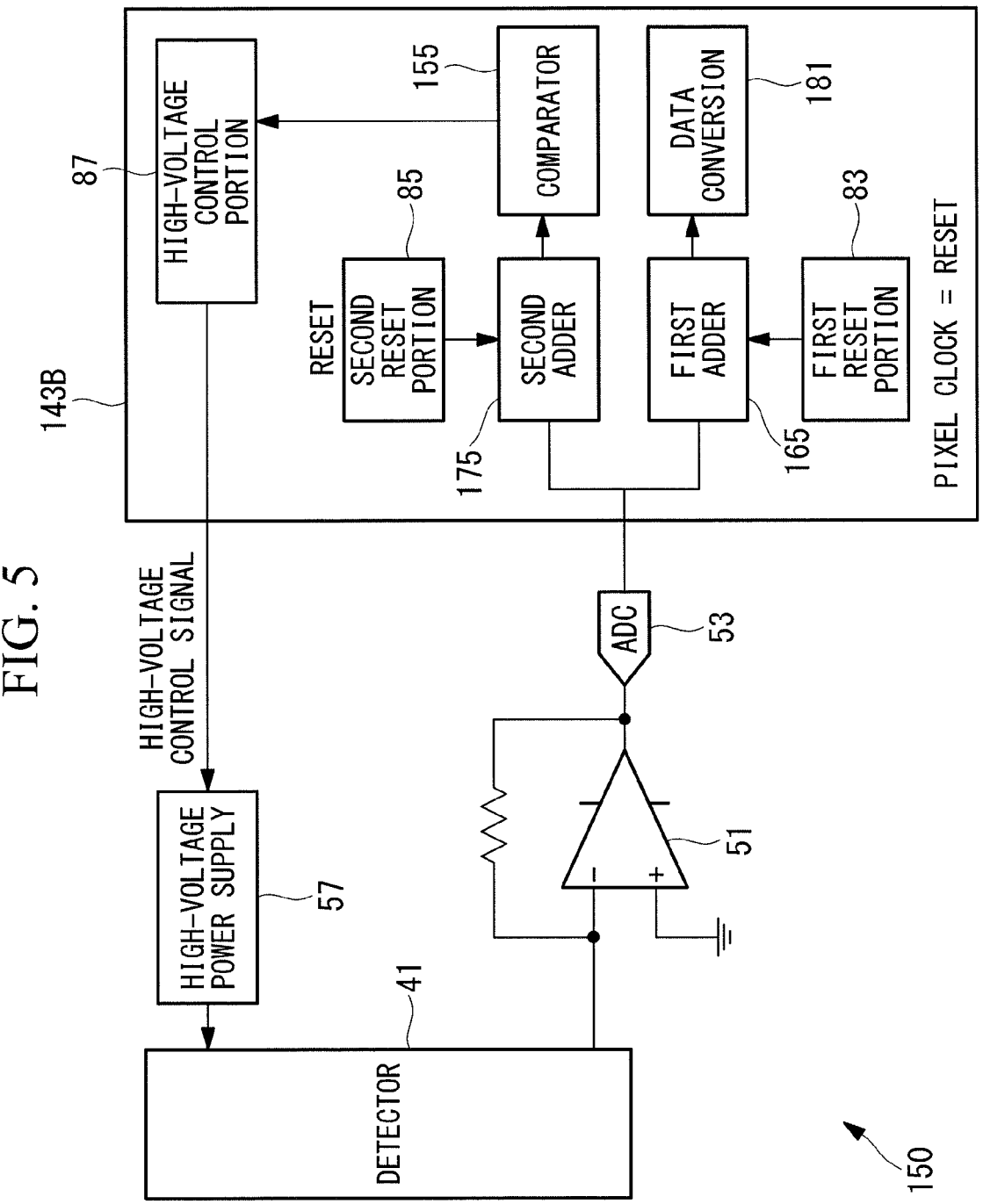
FIG. 5 is a block diagram showing details of a light detection circuit in a microscope system according to a second embodiment of the present invention.

As shown in FIG. 5, a light detection circuit 150 according to this embodiment includes an amplifier 51 that converts the current signal sent from the detector 41 into a voltage signal, an AD converter 53 that A/D converts the voltage signal converted by the amplifier 51, and a high-voltage power supply 57 that applies an HV to the detector 41. The voltage signal A/D converted by the AD converter 53 is sent to a detection-circuit control portion 143B.

The detection-circuit control portion 143B includes a first adder 165 and a second adder (calculating portion) 175 that add-up the voltage signal sent from the AD converter 53, a data conversion portion (image generating portion) 181 that converts the addition value added-up by the first adder 165 to image brightness data for each pixel, in association with the scanning position of the scanner 21, a comparator (threshold decision portion) 155 that compares the addition value added-up by the second adder 175 with a prescribed threshold (Ref), a first reset portion 83 that sends a first reset CLK to the first adder 165, and a second reset portion 85 that sends a second reset CLK to the second adder 175.

The first adder 165 is configured to reset the addition value of the added-up voltage signal using the first reset CLK sent from the first reset portion 83.

The second adder 175 is configured to reset the addition value of the added-up voltage signal using the second reset CLK sent from the second reset portion 85.

The first reset portion 83 outputs the first reset CLK at a prescribed pixel clock, so as to reset the first adder 165 at each pixel.

The second reset portion 85 outputs the second reset CLK with a period longer than the pixel clock of the first reset CLK, for example, at time intervals of 10 to 30 seconds, so as to reset the second adder 175 at time intervals longer than the reset timing of the first adder 165.

The operation of the thus-configured microscope system 100 will now be described.

When acquiring an image of the specimen S with the microscope system 100 according to this embodiment, the current signal output from the detector 41 is converted to a voltage signal by the amplifier 51, and the voltage signal is A/D converted by the AD converter 53 and is sent to the detection-circuit control portion 143B.

The voltage signal sent to the detection-circuit control portion 143B is input to the first adder 165 and the second adder 175. In the first adder 165, the voltage signal for each pixel is added-up, the addition value is sent to the data conversion portion 181, and the addition value is reset by the first reset CLK sent from the first reset portion 83.

Next, the addition value sent from the first adder 165 is converted by the data conversion portion 181 to image brightness data for each pixel, in association with the scanning position of the scanner 21, and is sent to the PC 45. By doing so, an image of the specimen S is generated in the PC 45 by accumulating the input image brightness data for each pixel and is displayed on the monitor 49.

In the second adder 175, the voltage signal is added-up at time intervals longer than the reset timing of the first adder 165, the addition value is sent to the comparator 155, and the addition value is reset by the second reset CLK output from the second reset portion 85.

Next, the addition value sent from the second adder 175 is compared, by the comparator 155, with an upper limit of the total amount of light at which degradation of the detector 41 advances, which is set as a prescribed threshold. Then, the high-voltage power supply 57 is switched ON/OFF by the high-voltage control portion 87 based on the comparison result of the comparator 155.

With the microscope system 100 according to this embodiment as described above, similarly to the case where an integrated value obtained by integrating the voltage signal is used as the light intensity information corresponding to the total light intensity signal output from the detector 41 in a given time, the total current signal output from the detector 41 in a given time is accurately calculated, and it is thus possible to perform observation by acquiring brightness information with a wide dynamic range while preventing degradation of the detector 41.

This embodiment can be modified in the following ways.

As a modification of this embodiment, a low pass filter (not illustrated) that removes noise from the voltage signal may be placed between the amplifier 51 and the AD converter 53. In this case, without providing the first adder 165 in the detection-circuit control portion 143B, the voltage signal output from the AD converter 53 may be converted to image brightness data by the data conversion portion 181 without adding it up.

Third Embodiment

Next, a microscope system (scanning laser microscope) according to a third embodiment of the present invention will be described with reference to the drawings.

Figure 6:
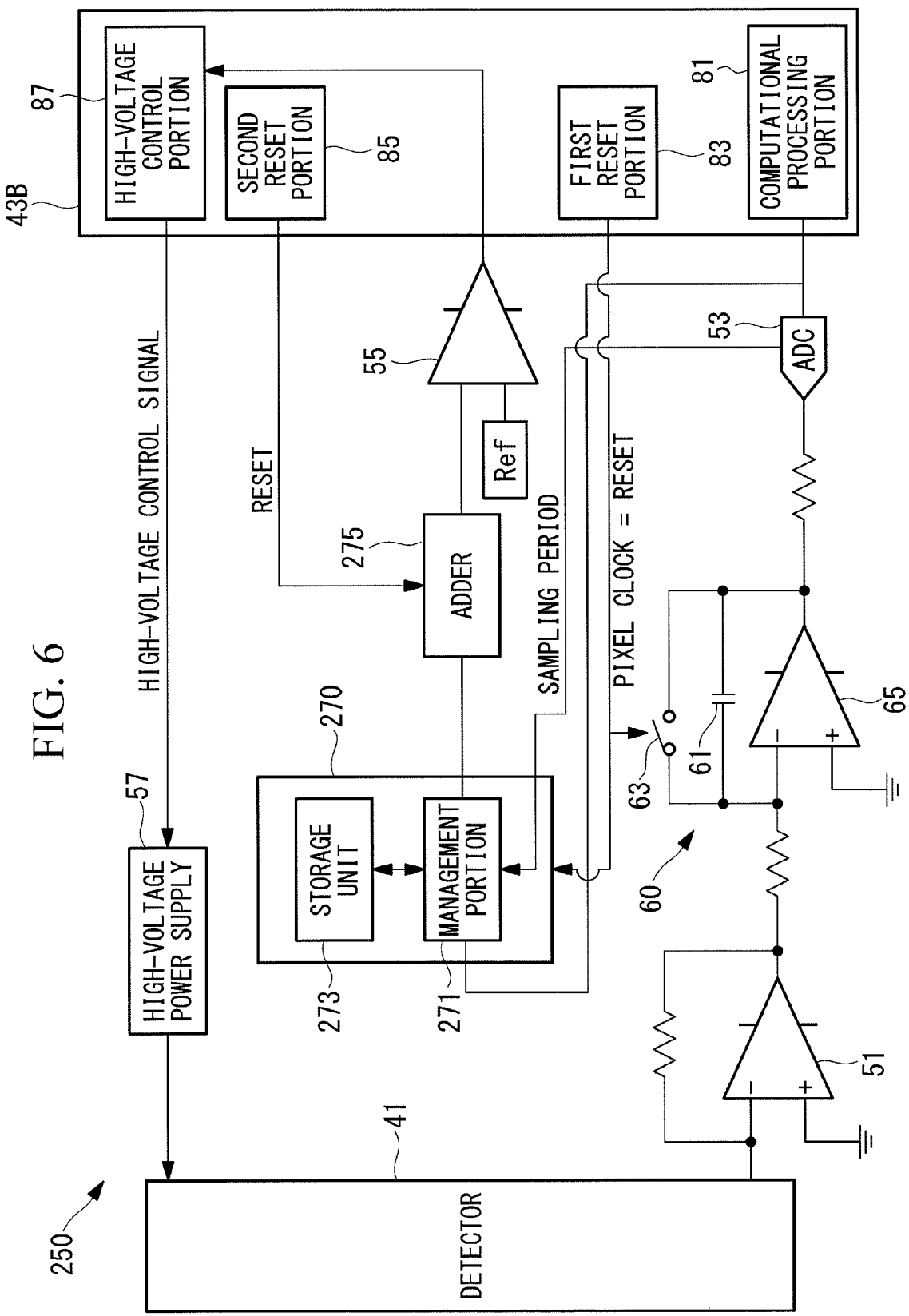
FIG. 6 is a block diagram showing details of a light detection circuit in a microscope system according to a second embodiment of the present invention.

As shown in FIG. 6, the microscope system 100 according to this embodiment differs from the first embodiment in that, as the calculating portion, the light detection circuit 250 is provided with, in place of the second integrating circuit 70, a signal processing portion 270 that processes the integrated value (first brightness information) of a digital signal output from the AD converter 53, and an adder (addition portion) 275 that adds-up the integrated value processed by the signal processing portion 270 and outputs the addition value (second brightness information) as light intensity information.

In the following, parts having the same configuration as those in the microscope system 100 according to the first embodiment are assigned the same reference signs, and a description thereof will be omitted.

The A/D converter 53 is configured so as to A/D convert the integrated value at a sampling period which is an integer fraction of a prescribed pixel clock and to send the integrated value of the digital signal to the computational processing portion 81 and the signal processing portion 270. The sampling period of the A/D converter 53 is sent to the signal processing portion 270, too.

The first reset portion 83 is configured so as to send, to the integrating circuit 60 and the signal processing portion 270, the first reset CLK output at the prescribed pixel clock.

The signal processing portion 270 includes a management portion 271 that determines an integrated value for addition, which must be added-up by the adder 275, within the integrated value of the digital signal sent from the A/D converter 53, and a storage unit 273 that stores the integrated value sent from the A/D converter 53 and the sampling time thereof.

The management portion 271 stores an upper limit at which A/D conversion by the A/D converter 53 is possible. With this management portion 271, the integrated value of the digital signal converted by the A/D converter 53 at each sampling period is compared with the upper limit of the A/D converter 53.

If the management portion 271 judges, as a result of the comparison, that the integrated value is smaller than the upper limit of the A/D converter 53, that integrated value and the sampling time thereof are associated with each other and stored time-sequentially in the storage unit 273. Also, if the management portion 271 judges, as a result of the comparison, that the integrated value is equal to the upper limit of the A/D converter 53, that integrated value and the sampling time are not stored in the storage unit 273.

Also, in the case where the management portion 271 compares the integrated value A/D converted by the A/D converter 53 at a timing that is synchronous with the first reset CLK with the upper limit, when the integrated value is smaller than the upper limit of the A/D converter 53, that integrated value is set as the integrated value for addition and is sent to the adder 275.

In the case where the integrated value A/D converted at a timing that is synchronous with the first reset CLK is compared with the upper limit, when the integrated value is equal to the upper limit of the A/D converter 53, the management portion 271 estimates the actual integrated value of the digital signal which exceeds the upper limit of the A/D converter 53 on the basis of the integrated values and the sampling times thereof stored in the storage unit 273. Then the management portion 271 sets that estimated value as the integrated value for addition and sends it to the adder 275. For example, the management portion 271 calculates the estimated value from the gradient of the integrated values time-sequentially stored in the storage unit 273 in each sampling period.

As the method used by the management portion 271 for calculating the estimated value to serve as the integrated value for addition, for example, it is possible to use the least squares method, a method in which it is calculated with a proportional expression, or the like. Regarding a method in which it is calculated with a proportional expression, for example, there is the method described in FIG. 3 of Japanese Unexamined Patent Application, Publication No. 2005-338465, and so forth. In this method, when the number of samplings at the time at which the output of the A/D converter 53 has saturated is SAMPLIM, the number of samplings per pixel is SAMPMAX, the threshold of the A/D converter 53 is VMAX, and the estimated value is VLAST, then the estimated value can be calculated with VLAST=VMAX×SAMPMAX/SAMPLIM.

The management portion 271 resets the integrated value input from the A/D converter 53 and the sampling time thereof using the first reset CLK sent from the first reset portion 83.

Similarly, the storage unit 273 also resets the stored integrated value and the sampling time thereof using the first reset CLK.

The adder 275 adds-up the integrated values of the digital signal sent from the management portion 271 with a period that is an integer multiple of the pixel clock and sends the addition value to the comparator 55. In addition, the adder 275 resets the added-up addition value of the voltage signals using the second reset CLK sent from the second reset portion 85.

The comparator 55 compares the addition value added-up by the adder 275 with a prescribed threshold (Ref) that is digitized.

The operation of the thus-configured microscope system 100 will now be described.

In the case where an image of the specimen S is acquired with the microscope system 100 according to this embodiment, the integrated value of the voltage signal, which is output from the first integrating circuit 60, is converted to a digital signal by the A/D converter 53 at the sampling period and is sent to the computational processing portion 81 and the signal processing portion 270.

In the signal processing portion 270, the integrated value of the digital signal converted by the A/D converter 53 in each sampling period is compared with the upper limit of the A/D converter 53 by the management portion 271. Then, if it is determined by the management portion 271 that the integrated value is smaller than the upper limit, that integrated value and the sampling time thereof are time-sequentially stored in the storage unit 273 in association with each other. This processing is repeated by the signal processing portion 270 until the first reset CLK is sent from the first reset portion 83.

When the first reset CLK is output from the first reset portion 83, in the management portion 271, the integrated value converted by the A/D converter 53 in synchronization with the first reset CLK is compared with the upper limit. In this case, if the integrated value is smaller than the upper limit, the management portion 271 sets that integrated value as the integrated value for addition and sends it to the adder 275.

On the other hand, if the integrated value converted in synchronization with the first reset CLK is equal to the upper limit of the A/D converter 53, the actual integrated value of the digital signal which exceeds the upper limit of the A/D converter 53 is estimated by the management portion 271 on the basis of the integrated values and the sampling times stored in the storage unit 273. Then, the management portion 271 sets that estimated value as the integrated value for addition and sends it to the adder 275.

Next, the integrated value sent from the management portion 271 is added-up by the adder 275 with a period that is an integer multiple of the pixel clock, and that addition value is sent to the comparator 55. The adder 275 resets the addition value using the second reset CLK output from the second reset portion 85.

Next, the addition value sent from the adder 275 is compared, by the comparator 55, with the upper limit of the total amount of light at which degradation of the detector 41 advances, which is set as a prescribed threshold. Then, the high-voltage power supply 57 is switched ON/OFF by the high-voltage control portion 87 on the basis of the comparison result in the comparator 55.

Therefore, with the microscope system 100 according to this embodiment, by calculating the light intensity information with the signal processing portion 270 and the adder 275 by using the brightness information that forms an image, it is possible to simplify the configuration, using just a single circuit for accumulating the light intensity signal.

In this case, when an excessively high level of light that exceeds the upper limit that can be A/D converted by the A/D converter 53 is incident on the detector 41, the output of the A/D converter 53 saturates, and the correct digital signal of the integrated value cannot be obtained. In contrast, with the microscope system 100 according to this embodiment, when the integrated value A/D-converted by the A/D converter 53 at the pixel clock is equal to the upper limit of the A/D converter 53, the management portion 271 estimates the integrated value for addition on the basis of the integrated value and sampling times stored in the storage unit 273. By doing so, even if an excessively high level of light that exceeds the upper limit of the A/D converter 53 is incident on the detector 41, the light intensity information can be precisely calculated by the adder 275, and the detector 41 can be reliably protected.

This embodiment can be modified in the following ways.

Specifically, although the voltage signal converted by the amplifier 51 is integrated by the first integrating circuit 60 in this embodiment, instead of this, similarly to the modification of the first embodiment, the current signal output from the detector 41 may be converted to a voltage signal by the amplifier 51 after being integrated by the integrating circuit 60.

In addition, in this embodiment, the signal processing portion 270, the adder 275, and the comparator 55 may be included in the detection-circuit control portion 43B.

Although embodiments of the present invention have been described above with reference to the drawings, the specific configurations are not limited to these embodiments, and design changes within a scope that does not depart from the scope of the present invention are also encompassed. For example, the present invention is not restricted to the individual embodiments and modifications described above, and may be applied to embodiments in which these embodiments and modifications are appropriately combined; it is not particularly limited.

In addition, in the individual embodiments described above, it has been assumed that, when the integrated value output from the second integrating circuit 70 or the addition value output from the second adder exceeds a prescribed threshold, the HV applied to the detector 41 is turned OFF by the high-voltage control portion 87. Instead of this, for example, when the integrated value output from the second integrating circuit 70 or the addition value output from the second adder exceeds the prescribed threshold, the light which would usually be incident on the detector 41 may be blocked.

More specifically, a shutter (blocking member, not illustrated) that can block the light which would usually be incident on the detector 41 and a controller (not illustrated) for inserting and removing the shutter may be employed. Then, when it is determined by the comparator 55 or 155 that the integrated value or addition value has exceeded the prescribed threshold, the controller may insert the shutter so as to block the light which would usually be incident on the detector 41.

By doing so, it is possible to prevent the light from being incident on the detector 41, without having to turn OFF the high-voltage power supply 57 which applies the HV to the detector 41. The shutter, for example, may be built into the detector 41 or may be disposed in an insertable/removable fashion in front of the detector 41.

Furthermore, the individual embodiments described above have been described by taking the upper limit of the total amount of light at which degradation of the detector 41 advances as an example of the prescribed threshold set in the comparators 55 and 155; however, the present invention is not restricted thereto, so long as degradation of the detector 41 can be prevented from advancing.

REFERENCE SIGNS LIST

10 light source unit (light source)
21 scanner (scanning portion)
41 detector (light detecting portion)
45 PC (image generating portion)
55, 155 comparator (threshold decision portion)
70 second integrating circuit (calculating portion)
81 computational processing portion (image generating portion)
87 high-voltage control portion (control portion)
100 microscope system (scanning laser microscope)
175 second adder (calculating portion)
181 data conversion portion (image generating portion)
271 management portion
273 storage unit
275 adder (addition portion)

The invention claimed is:

1. A scanning laser microscope comprising:
   a scanner that two-dimensionally scans laser light emitted from a light source on a specimen;
   a detector that detects light from the specimen on which the laser light is scanned by the scanner and that outputs a light intensity signal that corresponds to a light intensity of the detected light;
   a computer that converts the light intensity signal output from the detector to brightness information at each pixel corresponding to a scanning position of the scanner and that generates an image of the specimen;
   an integrating circuit that calculates light intensity information corresponding to a total light intensity signal output from the detector within a given time;
   a comparator that determines whether or not the light intensity information calculated by the integrating circuit exceeds a prescribed threshold; and
   a controller that stops detection of light by the detector when it is determined by the comparator that the light intensity information exceeds the prescribed threshold,
   wherein the computer generates the image of the specimen by accumulating the brightness information converted at each pixel at a prescribed pixel clock; and
   wherein the integrating circuit sets, as the light intensity information, an integrated value obtained by integrating, over a period longer than the pixel clock of the computer, the light intensity signal output from the detector within the given time.

2. A scanning laser microscope according to claim 1, wherein the integrating circuit performs integration processing during a scanning period in which the laser light is scanned on the specimen by the scanner and a flyback period in which emission of laser light from the light source is stopped and a scanning line of the laser light is returned to an original position.

3. A scanning laser microscope according to claim 1, wherein:
   the computer generates the image of the specimen using first brightness information obtained by accumulating the light intensity signal at each pixel at the prescribed pixel clock; and
   the integrating circuit sets, as the light intensity information, second brightness information obtained by adding-up the first brightness information for a plurality of pixel clocks.

4. A scanning laser microscope according to claim 3, wherein:
   the computer includes an A/D convertor that converts the first brightness information to a digital signal at a sampling period that is an integer fraction of the prescribed pixel clock;
   the integrating circuit includes a management portion that compares the first brightness information converted by the A/D convertor at the sampling period with an upper limit at which A/D conversion is possible by the A/D convertor and that sets brightness information to be added-up, a storage unit that stores the first brightness information and a sampling time thereof in association with each other, when it is determined by the management portion that the first brightness information is smaller than the upper limit, and an adder that adds-up the brightness information to be added-up, which is set by the management portion, at a period that is longer than the pixel clock; and
   when the first brightness information is smaller than the upper limit as a result of comparison at the individual pixel clocks, the management portion sets the first brightness information as the brightness information to be added-up, and when the first brightness information is equal to the upper limit, the management portion sets an estimated value based on the first brightness information and the sampling time thereof, which are stored in the storage unit, as the brightness information to be added-up.

5. A scanning laser microscope according to claim 1, wherein:
   the computer generates the image by adding-up the brightness information converted at each pixel at the prescribed pixel clock; and
   the integrating circuit sets, as the light intensity information, an addition value obtained by adding-up the light intensity signal output from the detector in a given time at a period longer than the pixel clock of the computer.

6. A scanning laser microscope according to claim 1, wherein the controller turns ON/OFF a control voltage applied to the detector.

7. A scanning laser microscope according to claim 1, wherein the controller inserts and removes a blocking member that blocks light that would otherwise be incident on the detector.

* * * * *